Dec. 17, 1940.   B. R. BENJAMIN   2,225,204
EARTH-WORKING DEVICE
Filed Aug. 9, 1939
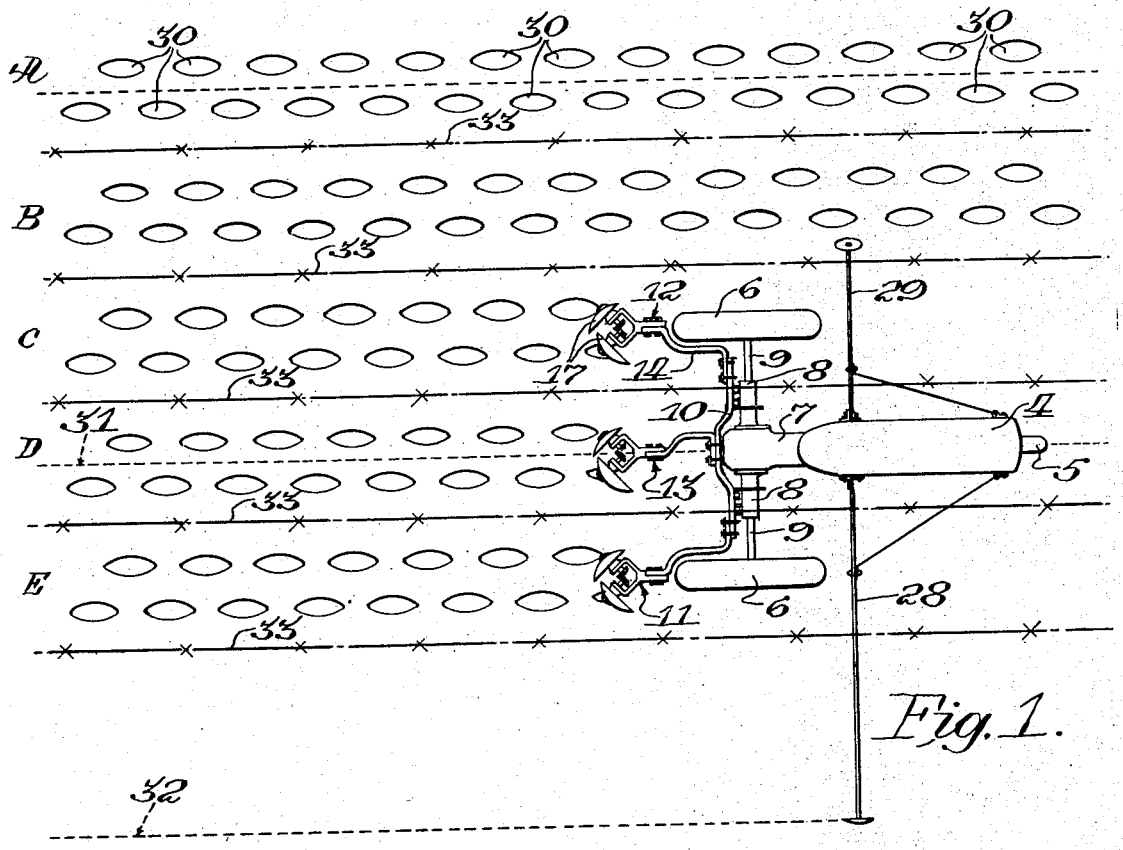
Fig. 1.
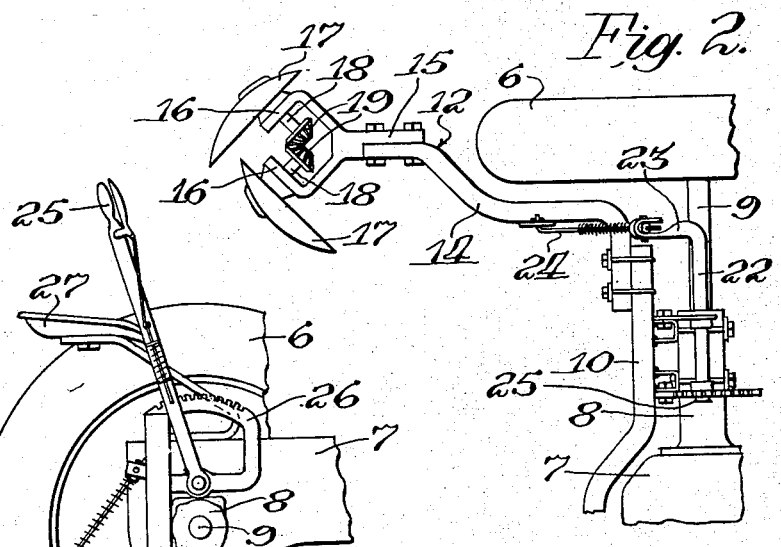
Fig. 2.
Fig. 3.
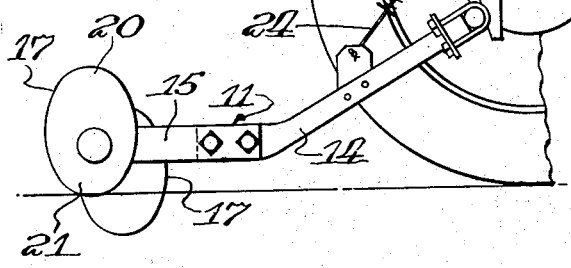
Inventor
Bert R. Benjamin
By Paul O. Pippel
Atty.

Patented Dec. 17, 1940

2,225,204

UNITED STATES PATENT OFFICE 2,225,204

EARTH-WORKING DEVICE

Bert R. Benjamin, Oak Park, Ill., assignor to International Harvester Company, a corporation of New Jersey Application August 9, 1939, Serial No. 289,142

8 Claims. (Cl. 97—47)

This invention relates to an earth-working device and more particularly to a device of the type adapted to be used in forming pits or basins as generally used for conserving moisture and for preventing soil erosion. The invention particularly contemplates the use of such devices in conjunction with a draft vehicle, such as a tractor.

The principal object of the present invention is to provide a pit- or basin-forming device which will form pits or basins in the field at such positions as to leave substantially uncut portions to serve as wheel tracks or paths for subsequent operation of the vehicle over the field.

An important object is to provide such a device in the form of a vehicle-connected support including a pair of soil-cutting members closely spaced apart transversely a distance substantially equal to the width of a wheel, the device being arranged generally in the longitudinal plane of the wheel.

Another important object is to mount a plurality of such devices on a tractor both for increasing the amount of pits or basins to be formed and for forming such pits with respect to a plurality of wheels on the vehicle.

Another object is to utilize such devices in conjunction with preparations for a subsequent planting operation wherein a marking device is associated with the vehicle for marking out in the field lines designating the positions of subsequent rows, the devices being related to such lines so as to form pits respectively at opposite sides thereof.

Another object is to provide a device in the form of a support rotatably carrying a pair of tilling elements in the form of disks.

Another object is to mount the disks on the support with their axes of rotation arranged at acute angles to the plane of longitudinal movement of the device.

Still another object is to mount the disks on the support with their axes of rotation angularly related.

Still another object is to mount each disk for rotation on an axis spaced radially from its true center, thus providing a deep-cutting and a shallow-cutting portion.

Still another object is to arrange the disks at opposite sides of the support with the deep-cutting portion of one generally opposite the shallow-cutting portion of another for cutting the soil at spaced, staggered points.

And, still another object is to provide means interconnecting the disks for conjoint rotation.

Briefly and specifically these and other desirable objects are achieved in one preferred form of the invention by the provision of a basin-forming device which is utilized in conjunction with a tractor having front and rear wheels. A basin-forming device is disposed generally longitudinally rearwardly of each wheel and each device comprises a pair of transversely spaced, eccentrically mounted disks rotatably carried on a tractor-connected support or draft element, the axes of rotation of the disks being angularly related. The disks are carried for rotation on angularly related shafts interconnected at their inner ends by bevel gears to provide for conjoint rotation of the disks. A marking device is also associated with the tractor for marking the field in lines for subsequent row-crop treatment, at least one of the basin-forming devices bearing a definite relation to the line thus marked, so that staggered pits are formed at opposite sides of a previously marked line.

The principle involved in the use of the marking device in conjunction with the pit-forming device embraces the function of so treating the field during the pit-forming operation as to eliminate the use of the marking devices when the field is subsequently row-planted.

A more complete understanding of the aforesaid and other objects and certain desirable features of the invention may be had from the following detailed description taken in conjunction with the accompanying sheet of drawings, in which:

Figure 1 is a diagrammatic plan view illustrating the use of the invention and its function in preparing a field by forming pits therein;

Figure 2 is a somewhat enlarged plan view of a preferred form of pit-forming device showing its relation to the rear portion of a tractor; and, Figure 3 is a side view of the same.

A preferred form of the invention has been illustrated in connection with a tractor of the tricycle type having a longitudinally extending, narrow body 4 carried at its front end on a steerable front truck 5 and at its rear on a pair of transversely spaced rear ground supports or wheels 6. The main body 4 includes also a centrally disposed, rearwardly extending transmission part 7 having oppositely extending transverse axle housings 8 journaling drive axles 9 for driving the rear wheels 6.

A preferred type of earth-working device is associated with the tractor through the medium of a first frame 10 extending transversely across the rear end of the tractor and secured adjacent opposite ends to the rear axle housings 8. This frame 10 includes right hand, left hand, and center earth-working devices 11, 12 and 13, respectively. Each device includes a support or draft element in the form of a longitudinally extending bar member 14 rigidly connected at its forward end to the first frame 10. Each device further includes a secondary supporting member in the form of a rearwardly extending bracket 15 having a rearward bifurcated end including angularly related bearing portions 16. Each device is preferably disposed rearwardly and generally in longitudinal alinement with a tractor wheel, or, as may be said, generally in the longitudinal wheel plane.

Each device includes preferably a pair of pit- or basin-forming elements in the form of disks 17. Each disk is carried at a point radially spaced from its true center on a shaft 18 journaled in a bearing portion 16 of the bifurcated bracket or member 15. A pair of bevel gears 19, carried respectively at the inner ends of the shafts 18, provides means for interconnecting the elements or disks 17 for conjoint rotation. The axes of rotation of the disks 17 are angularly related and each is disposed at an acute angle with respect to the longitudinal line of travel of the tractor. The plane of each disk 17 generally intersects the wheel plane of the particular wheel behind which the device is located.

Each disk, because of its eccentric mounting, has a larger portion thereof disposed diametrically at one side of its mounting shaft 18 and a smaller cutting portion or ground-engaging portion at the opposite side of the shaft 18. The larger portion may be generally spoken of as a deep-cutting portion 20, and the smaller portion as a shallow-cutting portion 21. In the present instance, since the elements 17 are circular disks, the cutting portions 20 and 21 are not separate, but are included in the contiguous extent of the disk. It will be understood, of course, that other types of tilling elements may be utilized with more or less advantageous results, depending upon surrounding circumstances. As best shown in Figure 2, the disks 17 are spaced closely apart transversely of a wheel plane and are arranged with respect to each other with the deep-cutting and shallow-cutting portions in alternate relation; that is, the deep-cutting portion 20 of one disk is generally transversely opposite the shallow-cutting portion of the other. This relation is illustrated in another position of the disks in Figure 3. The desirability of this particular arrangement will be realized subsequently in the description of the operation of the devices in the treatment of the field.

A transverse rock-shaft 22 is arranged on a rear axle housing 8 and is appropriately connected by a rearwardly extending arm 23 and a pressure link 24 to the forwardly extending member 14 of one of the earth-working devices. An operating lever 25 is rigidly connected to one end of the rock-shaft 22 and is associated with a sector 26 carried by the rear axle housing 8. The lever 25 extends within convenient reach of an operator's station 27 on the tractor and may be operated for raising and lowering the devices. In the present instance, the lifting arrangement is such that the devices are all lifted simultaneously, but it will be understood that individual lifting means can be readily provided. The pressure link 24 serves in an appropriate manner to maintain the devices in ground-engaging positions.

According to another important object and feature of the invention, the tractor is provided with a pair of marking devices at the right and left hand sides thereof, as at 28 and 29, respectively. These devices may be of conventional construction and are illustrated only diagrammatically in Figure 1. It will be understood that appropriate lifting means may be provided for alternately raising and lowering the marking devices.

The invention has been illustrated in conjunction with a tractor of the tricycle type merely for the purpose of better explaining its operation, and it will be understood that the earth-working devices may be readily used with a four-wheel tractor or any other type vehicle when necessary or desired.

Referring now to Figure 1, the tractor is illustrated as having progressed partly over a field in the formation of a second plurality of rows of pits or basins after having formed a plurality of other such rows while traveling in the opposite direction. Each row of pits or basins comprises a plurality of pairs of staggered pits 30. These pits are formed in staggered relation because of the arrangement of the disks 17, as previously described. For purposes of clarifying the description, the pit rows will be designated by the letters A, B, C, D and E, beginning at the top of the illustration in Figure 1. The rows A and B are illustrated as having been previously formed by the left hand and center devices 12 and 13, respectively, while the tractor was traveling in a direction opposite to that in which it is illustrated as traveling. In short, the first direction of travel was from right to left, as viewed in Figure 1. The first row of pits formed by the right hand device 11 is not shown in the figure. While the tractor and devices were forming the rows A and B and the one omitted, the marking device 29 was marking the field with a longitudinal mark, illustrated in Figure 1 by the broken line 31, extending down the center of the row D. This line 31 forms the center line of said row and, as shown in the figure, the staggered pits 30 are formed respectively at opposite sides thereof. The line 31 serves also as a guide for the tractor front ground support or wheel 5 when the tractor is operated in the direction shown. Since the pits 30 are spaced transversely apart, a generally uncut and substantially level portion of the field remains between the pits and serves as a longitudinal path or track traveled by the wheel 5. It will be seen at this point that the tractor may be subsequently operated over the prepared field with the front wheel traveling this path or track as formed along the line 31. The pits 30 at the opposite sides of this line are, of course, formed by the elements or disks 17 of the center device 13, the disks thus forming pits at opposite sides of the wheel track for the front wheel 5. While the tractor is progressing in the direction as illustrated, from left to right in Figure 1, the marking device 29 has been raised and is thus rendered inoperative, and the marking device 28 has been lowered and is operative to mark the field along a line 32, as illustrated in Figure 1. This line 32 serves as a guiding line for the front wheel 5 of the tractor after the rows C, D and E are completed, when the direction of travel of the tractor becomes again from right to left to form three more rows of pits similar to those already formed.

The location of the devices 11, 12 and 13 behind the wheels 6 and 5, respectively, provides for the formation of pits or basins at opposite sides of the respective wheels, the disks in each case being spaced transversely apart a distance substantially equal to the width of the annular tread portion of the respective wheel; the devices thus form a plurality of paths or tracks bounded at opposite sides by spaced pits or basins.

The important principle in forming basins or pits involves the provision of alternately operable devices in order that spaced pits or basins, rather than furrows, may be formed in the soil. The particular devices illustrated herein are admirably adapted for this purpose, although it will be understood that other pit- or basin-forming devices may be utilized. The function of an eccentrically mounted disk in forming pits or basins is best disclosed in assignee's Patent No. 2,136,607. Briefly, the eccentrically mounted disk cuts alternate pits in the field because of the alternately varying sizes of the portions of the disk that enter the ground. Thus, in the type of disk illustrated herein, such as 17, the deep-cutting portion 20 of the disk serves to cut the soil to a greater and then to a less extent as the disk rotates and as the shallow-cutting portion 21 engages the soil. Under certain circumstances, depending upon the nature of the soil, the shallow-cutting portion 21 will enter the soil to greater or lesser extents and at times may only ride the soil surface. Since the disks are interconnected by the bevel gears 19 for conjoint rotation, the effect of the cutting thereof will be identical at all times, the bevel gears maintaining an unchangeable, timed relationship. The disks may, however, be adjusted on the shafts 18 to obtain differently spaced pits. The extent of soil penetration of the shallow-cutting portion 21 of one disk will generally determine the extent of penetration of the transversely opposite deep-cutting portion 20 of the related disk. The shallow-cutting portion 21 of the one disk serves, through the medium of the bevel gears 19, as a driver for the other disk while the deep-cutting portion of the latter is forming a pit 30. It will be understood, of course, that the pits 30 are not formed solely by the deep-cutting portions 20, since the disk peripheries are continuous and certain portions of the pits will be formed by the shallow-cutting portions 21 and intermediate portions of the disk periphery between the cutting portions. This function may be readily understood from an examination of the shapes of the pits 30, as illustrated in Figure 1. As the disk 17 rotates, first a greater and then gradually a smaller portion thereof penetrates the soil; and, since the disk is arranged at an angle with respect to the longitudinal line of travel, the pit becomes gradually wider and then gradually narrower in direct proportion to the depth. Further, since each disk has a continuous periphery, a certain amount of loose soil will be distributed or thrown by one disk into the space between longitudinally adjacent pits, and other lesser amounts may be thrown directly on the wheel path or track that is provided between transversely adjacent pits. These latter amounts of soil are, however, so minute as not to form serious obstacles in the paths of the tractor wheels; and this soil, being loose, is easily packed as the wheel rolls over it.

Another important feature of the invention that results from the formation of the rows of pits A, B, etc., is the elimination of marking devices in connection with subsequent planting operations. The wheel tracks or paths formed between the pits 30 serve as guiding lines for the tractor wheels when the tractor is utilized in conjunction with a planting machine. The planter may be thus operated over the field to plant in rows, generally indicated at 33 in Figure 1, between each adjacent pair of pitted rows A, B, etc. The elimination of the use of marking devices is of considerable aid to the operator of the planting machine, since the tractor is more easily guided along the wheel tracks provided between the pits 30, whereby the operator may devote more attention to the planter checking mechanism.

The invention may be further utilized in pit- or basin-forming after crops have been planted. In such a case, the planted rows 33 are provided in the field by a prior instead of a subsequent operation. The tractor with its associated devices 11, 12 and 13 is then operated over the field, the wheels 5 and 6 being operable intermediate the planted rows, thus preventing damage to seed hills or growing plants. The rows of pits A, B, etc., because of the location of the earth-working devices, are formed as before in relation to the paths or tracks of the wheels as the vehicle progresses over the field. As will be noted from the illustration in Figure 1, the pits 30 are appropriately located with respect to the plant rows 33. In this instance, where the pits are formed after the formation of the planted rows, the marking devices 28 and 29 need not be used, since the tractor may be easily guided between the planted rows. The wheel tracks or paths thus formed may be used in guiding the tractor during subsequent cultivating.

As previously mentioned, the disks 17 operate admirably to form the desired pits, and the function thereof has been set forth somewhat in detail in order to clarify further the use of the present invention. It will be understood, of course, that other types of pit-forming devices may be substituted for the devices illustrated and such devices or the illustrated devices may be used in conjunction with vehicles of different types; and that other alterations and modifications may be made in the preferred construction described without departing from the spirit and scope of the invention as defined in the appended claims.

What is claimed is:

1. An earth-working device comprising a support, and a pair of disks mounted thereon for rotation respectively about angularly related axes, the axis of rotation of each disk being spaced from the true center of the disk.

2. An earth-working device comprising a support, and a pair of rotatable substantially circular tilling elements mounted thereon and having angularly related axes of rotation, each element including generally diametrically opposed soil-engaging portions disposed at different distances from its said axis of rotation.

3. An earth-working device comprising a support, and a pair of rotatable tilling elements mounted thereon and having angularly related axes of rotation, each element including generally diametrically opposed soil-engaging portions disposed at greater and lesser distances from its said axis of rotation, the greater portion of one element being arranged generally opposite the lesser portion of the other element.

4. An earth-working device comprising a support, a pair of rotatable tilling elements mounted thereon and having angularly related axes of rotation, each element including generally diametrically opposed soil-engaging portions disposed at different distances from its said axis of rotation, and means interconnecting the elements for conjoint rotation.

5. An earth-working device comprising a support, a pair of rotatable tilling elements mounted thereon and having angularly related axes of rotation, each element including generally diametrically opposed soil-engaging portions disposed at greater and lesser distances from its said axis of rotation, the greater portion of one element being arranged generally opposite the lesser portion of the other element, and means interconnecting the elements for conjoint rotation.

6. An earth-working device comprising a support, a pair of disks mounted thereon for rotation respectively about angularly related axes, the axis of rotation of each disk being spaced from the true center of the disk, and means interconnecting the elements for conjoint rotation.

7. In combination, a vehicle having a ground wheel, and a soil-tilling device associated with the vehicle and disposed generally in longitudinal alinement with and spaced closely behind said wheel, said device including a pair of transversely spaced disks engageable with the soil respectively at opposite sides of the wheel track, each disk being arranged in a plane intersecting the wheel plane, the planes of the disks also intersecting.

8. In combination, a vehicle having a front steerable wheel, and a soil-tilling device associated with the vehicle and disposed rearwardly of the wheel generally in longitudinal alinement therewith, said device including a pair of transversely spaced, angularly related disks, one at each opposite side of the path traveled by the wheel.

BERT R. BENJAMIN.